(12) United States Patent
Wang

(10) Patent No.: US 12,131,449 B2
(45) Date of Patent: *Oct. 29, 2024

(54) IMAGE CLEANUP ON A MOBILE DEVICE

(71) Applicant: eBay Inc., San Jose, CA (US)

(72) Inventor: Qiaosong Wang, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,643

(22) Filed: Sep. 12, 2023

(65) Prior Publication Data
US 2023/0419457 A1    Dec. 28, 2023

Related U.S. Application Data

(63) Continuation of application No. 18/120,309, filed on Mar. 10, 2023, now Pat. No. 11,803,944, which is a
(Continued)

(51) Int. Cl.
*G06T 7/194*      (2017.01)
*G06F 18/24*     (2023.01)
(Continued)

(52) U.S. Cl.
CPC ............ *G06T 5/77* (2024.01); *G06F 18/24* (2023.01); *G06T 3/4084* (2013.01); *G06T 5/70* (2024.01);
(Continued)

(58) Field of Classification Search
CPC ....... G06T 5/005; G06T 3/4084; G06T 5/002; G06T 7/194; G06T 2207/20084;
(Continued)

(56) References Cited

U.S. PATENT DOCUMENTS 11,631,161 B2 *   4/2023   Wang ................. G06T 5/77
                                                  382/173
11,803,944 B2 *  10/2023   Wang ................. G06T 7/194
(Continued)

FOREIGN PATENT DOCUMENTS

CN    107730528 A    2/2018
CN    109712165 A    5/2019

OTHER PUBLICATIONS

U.S. Appl. No. 17/089,603 , "First Action Interview Office Action Summary received for U.S. Appl. No. 17/089,603, mailed on Sep. 21, 2022", Sep. 21, 2022, 3 pages.
(Continued)

*Primary Examiner* — Phuoc Tran
(74) *Attorney, Agent, or Firm* — FIG. 1 Patents

(57) ABSTRACT

Methods, systems, and articles of manufacture, including computer program products, are provided for image cleanup. In some embodiments, there is provide a method which may include subsampling a first image to a first level image of a multiscale transform; performing, based on a machine learning model, an identification of a foreground portion of the first level image and a background portion of the first level image; generating, based on the identification of the foreground portion and the background portion, a first mask; upscaling the first mask to a resolution corresponding to the first image depicting the foreground item; applying the upscaled first mask to the first image to form a second image depicting the foreground item; and providing the second image depicting the foreground item to a publication system. Related systems and articles of manufacture, including computer program products, are also provided.

20 Claims, 8 Drawing Sheets

Related U.S. Application Data continuation of application No. 17/089,603, filed on Nov. 4, 2020, now Pat. No. 11,631,161.

(51) Int. Cl.
  *G06T 3/4084* (2024.01)
  *G06T 5/70* (2024.01)
  *G06T 5/77* (2024.01)

(52) U.S. Cl.
  CPC .... *G06T 7/194* (2017.01); *G06T 2207/20084* (2013.01)

(58) Field of Classification Search
  CPC . G06T 2207/10004; G06T 2207/20072; G06T 2207/20081; G06T 2207/20096; G06F 18/24; G06V 10/26; G06V 10/52; G06N 20/00
  See application file for complete search history.

(56) References Cited

U.S. PATENT DOCUMENTS

| | | |
|---|---|---|
| 2017/0076438 A1 | 3/2017 | Kottenstette et al. |
| 2019/0340462 A1 | 11/2019 | Pao et al. |
| 2019/0355128 A1 | 11/2019 | Grauman et al. |
| 2020/0167930 A1 | 5/2020 | Wang et al. |
| 2020/0327334 A1 | 10/2020 | Goren et al. |
| 2021/0027100 A1 | 1/2021 | Bogdanovych et al. |
| 2022/0138914 A1 | 5/2022 | Wang |
| 2023/0206407 A1 | 6/2023 | Wang |

OTHER PUBLICATIONS

U.S. Appl. No. 17/089,603 , "First action interview Pre-Interview communication received for U.S. Appl. No. 17/089,603, mailed on Jul. 22, 2022", Jul. 22, 2022, 4 pages.
U.S. Appl. No. 17/089,603 , "Notice of Allowance Received for U.S. Appl. No. 17/089,603, mailed on Dec. 15, 2022", Dec. 15, 2022, 7 pages.
U.S. Appl. No. 18/120,309, filed Jul. 20, 2023 , "Non-Final Office Action", U.S. Appl. No. 18/120,309, filed Jul. 20, 2023, 8 pages.
U.S. Appl. No. 18/120,309, filed Aug. 17, 2023 , "Notice of Allowance", U.S. Appl. No. 18/120,309, filed Aug. 17, 2023, 7 pages.
21197927.3 , "Communication under Rule 71(3) EPC received for European Patent Application No. 21197927.3, mailed on Mar. 15, 2023", Mar. 15, 2023, 8 pages.
21197927.3 , "Extended European Search Report received for European Patent Application No. 21197927.3 mailed on Jul. 12, 2022", Jul. 12, 2022, 17 pages.
21197927.3 , "Partial European Search Report received for European Patent Application No. 21197927.3 mailed on Mar. 18, 2022", Mar. 18, 2022, 15 pages.
23166626.4 , "Extended European Search Report", EP Application No. 23166626.4, Aug. 4, 2023, 14 pages.
23166626.4 , "Notice of Allowance", EP Application No. 23166626.4, Nov. 9, 2023, 44 pages.
Garcia , et al., "Fast image segmentation on mobile phone using multi-level graph cut", Graphics Interface 2005 : Proceedings ; Victoria, British Columbia, May 9-11, 2005, Canadian Information Processing Society, 403 King Street West, Suite 205 Toronto, Ont. M5U ILS Canada, Jun. 3, 2015, pp. 81-88.
Gastal, Eduardo S.L., et al., "Domain Transform for Edge-Aware Image and Video Processing", ACM Transactions on Graphics, vol. 20, No. 4, Jul. 1, 2011, 12 pages.
Ge, Ling, et al., "Interactive RGB-D Image Segmentation Using Hierarchical Graph Cut and Geodesic Distance", Advances in Biometrics; International Conference, ICB 2007, Seoul Korea, Aug. 27-29, 2007; Proceedings, Nov. 22, 2015, pp. 114-124.
Guha , et al., "A Multiscale Co-linearity Statistic Based Approach to Robust Background Modeling", Computer Vision—ACCV 2006 Lecture Notes in Computer Science;;LNCS, Springer, Berlin, Jan. 1, 2005, pp. 297-306.
Hu, Jiagao , et al., "Progressive Image Segmentation Using Online Learning", 18th International Conference, Austin, TX, USA, Sep. 24-27, 2015; Lecture Notes in Computer Science, Nov. 22, 2015, pp. 181-191.
Li, Jianbo , et al., "KM_GrabCut: A Fast Interactive Image Segmentation Algorithm", Proceedings of SPIE, IEEE, US, vo. 9443, Mar. 4, 2015, 7 pages.
Rother, Carsten , et al., ""GrabCut"—Interactive Foreground Extraction using Iterated Graph Cuts", ACM Transactions on Graphics, vol. 23, No. 3, Aug. 1, 2004, 6 pages.
Zhou, Bowei , et al., "Interactive Deep Editing Framework for Medical Image Segmentation", arxiv.org, Cornell University Library, 201 Olin Library Cornell University, Ithaka, NY 14853, Oct. 10, 2019, pp. 329-337.
202111267747.X , "Foreign Office Action", CN Application 202111267747.X, May 23, 2024, 6 pages.

* cited by examiner

IMAGE CLEANUP ON A MOBILE DEVICE

RELATED APPLICATIONS

This application is a continuation of U.S. patent application Ser. No. 18/120,309, filed Mar. 10, 2023, entitled "IMAGE CLEANUP ON A MOBILE DEVICE," which is a continuation of U.S. patent application Ser. No. 17/089,603, filed Nov. 4, 2020, entitled "IMAGE CLEANUP ON A MOBILE DEVICE," which are incorporated by reference in their entirety.

BACKGROUND

Computerized image processing may include the automated extraction of meaningful information from images, such as digital images using digital image processing techniques. Some instances of such image processing involve automated identification of foreground and background objects in photographs or pictures. The segmentation of the foreground and background objects may be used as part of a process to cleanup images before publication or initiating a search, such as an image search.

SUMMARY

Methods, systems, and articles of manufacture, including computer program products, are provided for image cleanup. In some embodiments, there is provide a method. This method may include obtaining, at a user equipment, a first image depicting at least a foreground item; subsampling, at the user equipment, the first image to a first level image of a multiscale transform; performing, at the user equipment and based on a machine learning model, an identification of a foreground portion of the first level image and a background portion of the first level image; generating, at the user equipment and based on the identification of the foreground portion and the background portion, a first mask; upscaling, at the user equipment, the first mask to a resolution corresponding to the first image depicting the foreground item; applying, at the user equipment, the upscaled first mask to the first image to form a second image, the second image depicting the foreground item with at least a portion of the background portion of the second image removed; and/or providing, at the user equipment, the second image depicting the foreground item to a publication system.

In some variations, one or more of the features disclosed herein including the following features may optionally be included in any feasible combination. The upscaling may further include applying a domain transform to upscale and smooth the first mask. A first border of pixels may be assigned around at least a portion of the first level image to initialize the machine learning model to classify the portion as solid background. Based on the machine learning model and the assigned first border as the solid background, pixels of the first level image may be classified as likely the foreground portion or likely the background portion, wherein the first mask is generated based on the classified pixels. The machine learning model may include a Gaussian mixture model, a GrabCut, and/or a neural network. The first border of pixels may include a set quantity of pixels around at least the portion of the first level image. The set quantity may be five. The set quantity may provide an initial state of the machine learning model to enable classification of one or more pixels of the first level image as solid background, likely background, solid foreground, or likely foreground. The subsampling may further include smoothing the first image to form the first level image. The applying may include causing a display of the second image; receiving an indication of a scribble on the second image; modifying, based on the scribble or a dilated scribble, the first mask by at least adding or removing one or more pixels of the first mask; and applying the modified first mask to the second image. The first mask may be smoothed before the applying. The user equipment may obtain the first image by capturing the image from an imaging sensor of the user equipment, downloading the first image, downloading the first image from a third party website, and/or capturing the first image as a screen grab from a display of the user equipment. The foreground portion of the first level image and the background portion of the first level image may correspond to a subsampled and smoothed version of the background and foreground portions of the first image. The second image may be caused to be displayed as a listing of the publication system.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the virtualization of configuration data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
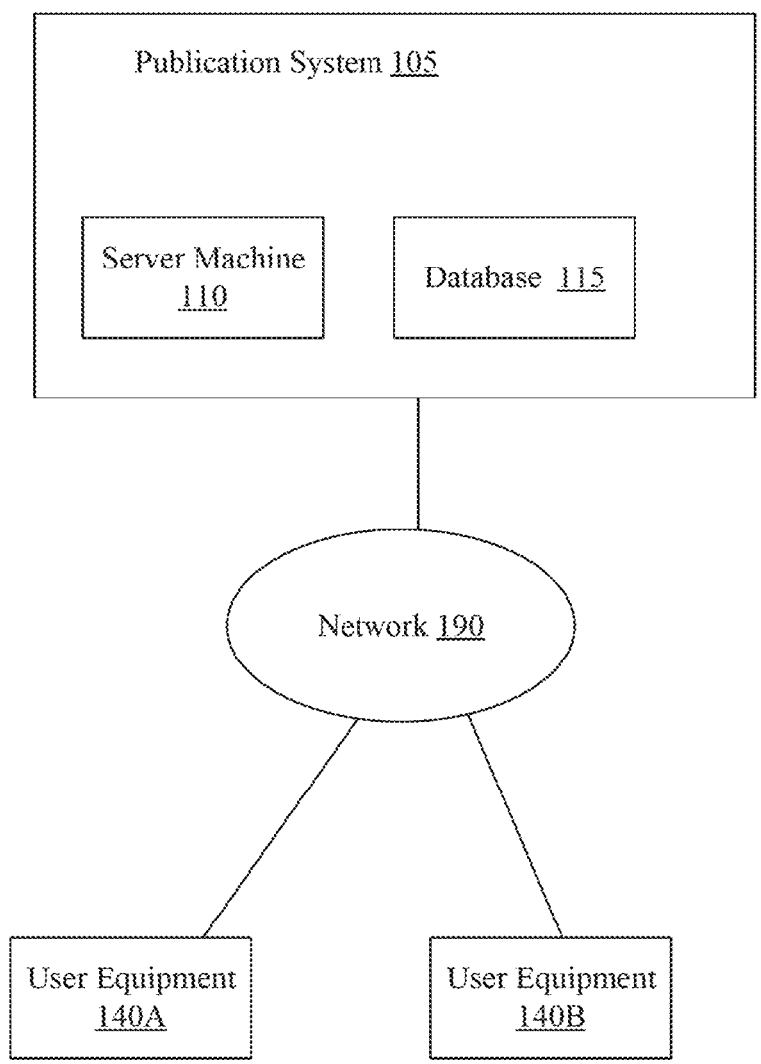
FIG. 1 is a diagram of an example of a system suitable for image cleanup, in accordance with some example embodiments.

When practical, like labels are used to refer to same or similar items in the drawings.

DETAILED DESCRIPTION

Image cleanup may include the removal of a background portion of an image, such that the image primarily includes one or more foreground items of interest. Precisely separating the foreground portion of an image from the background may improve the quality of the image and/or improve the ability of a system, such as an image search system, a publication system, and/or the like, to automatically identify the foreground item(s) in an image. To illustrate by way of another example, if a user at a mobile device seeks to publish an item on the publication system, removing the background portion of the image may enable other users on other mobile devices to assess the actual item being published without distraction from the background. Likewise, an image search may focus an image search on the foreground item of interest in the image, rather than on the background (which is not of interest). The removed background may be replaced with a solid background, such as a white or other color background, or a bokeh effect may be applied to further emphasize the foreground item(s). The cleaned-up image including the foreground item of interest (without the background) may be, as noted, used for enhanced image searching, enhanced publication, and/or enhanced insertion into other media.

Although the noted image cleanup to remove the background portion may be desirable, this image cleanup may require a considerable amount of computer processor and memory resources. Rather than implement image cleanup at the backend server system of the publication system for example, implementing the noted image cleanup at the user's mobile device may distribute that burden from the backend server system to mobile devices, such as a smart phone, a tablet, or other processor based device associated with a user such as an end-user (collectively referred to herein as user equipment). Because the user equipment can be more processing and resource constrained when compared to a backend server system, the image cleanup processes may need to be adapted to operate using less memory and/or computer processor resources. To that end, there is disclosed herein one or more processes that facilitate image cleanup on a user equipment where memory and/or processor resources may be more constrained, when compared to the physical servers commonly used at a backend system, such as an image search system, publication system, and/or the like.

In some example embodiments, a user equipment may obtain a first image depicting at least a foreground item. The user equipment may then subsample the first image to a first level image of a multiscale transform. The user equipment may automatically perform, based on a machine learning model, an identification of a foreground portion of the first level image and a background portion of the first level image. Next, the user equipment may generate, based on the identified portions, a first mask. This first mask may then be upscaled to a resolution corresponding to the first image depicting the foreground item. The user equipment may then apply the upscaled first mask to the first image to form a second image. This second image depicts the foreground item with at least a portion (if not all) of the background portion removed using the first mask. The user equipment may then provide the second image depicting the foreground item to another system, such as a publication system to enable enhanced image searching, enhanced publication, and/or enhanced insertion into other media.

FIG. 1 is a diagram of an example of a system 100 suitable for image cleanup, in accordance with some example embodiments. The system 100 may include a server machine 110, a database 115, one or more user equipment 140A-B, all of which may be communicatively coupled to each other via a network 190.

The publication system 105 may include one or more server machines, such as server machine 110, and may further include one or more databases, such as a database 115. The publication system may be a networked-based publication system configured to cause to publish to other devices (such as other user equipment) one or more items. Although a publication system is depicted, the publication system may also be comprised in, or comprise, an image search system, a social media system, an e-commerce system, and/or other types of systems. In the example of FIG. 1, the database 115 may store images of items, which may be searched for, published to other devices, and/or the like. In some implementations, the publication system may list over a billion items, some of which may be stored in database 115 as a listing (although other quantities of items may be implemented as well). For example, a user equipment (which is associated with a user) may capture an image, cleanup the capture image, in accordance with the embodiments disclosed herein, and then send the image including primarily the item of interest in the foreground to the publication system (e.g., to cause publication of the image depicting the item to others, initiate a search for other similar or related items, and/or the like).

The server machine 110 may form all or part of the publication system 105. For example, one or more cloud-based server systems may be used at 110 to provide one or more services to the user equipment 140A-B. The server machine 110 and the user equipment 140A-B may each be implemented in a processor-based device as described below with respect to FIG. 2. The server machine 110 may include a server, a web server, a database management system, or other machine capable of receiving and processing information, such as image data of a captured image depicting one or more items. The server machine 110 may be a portion of a publication system as shown, although the server machine may be a portion of an image search system, social media system, a website, a database, and/or other type of system.

The server 110, the database 115, and/or the user equipment 140A-B depicted at FIG. 1 may be implemented in a general-purpose computer modified (e.g., configured or programmed) by software to be a special-purpose computer to perform one or more of the functions described herein for the server machine 110, the database 115, and/or the user equipment 140A-B For example, a computer system able to implement any one or more of the methodologies described herein. As used herein, a "database" is a data storage resource and may store data structured as a text file, a table, a spreadsheet, a relational database (e.g., an object-relational database), a triple store, an in-memory database, a hierarchical data store, or any suitable combination thereof. Moreover, any two or more of the devices illustrated in FIG. 1 may be combined into a single device, and the functions described herein for any single device may be subdivided among multiple device.

The user equipment 140A-B may comprise, or be comprised in, a processor-based device, such as a smartphone, a desktop computer, a vehicle computer, a tablet computer, a navigational device, a portable media device, an Internet of Things device (e.g., a sensor, actuator, etc.), a wearable device (e.g., a smart watch, smart glasses), and/or the like. The user equipment may be accessed by a user to enable the capture of images, for example. For example, the user equipment may obtain a first image depicting a foreground item as well as a background. The user equipment may also subsample the first image to a first level image of a multi-scale transform. Moreover, the user equipment may perform, based on a machine learning (ML) model, an identification of a foreground portion of the first level image and a background portion of the first level image. The user equipment may generate, based on the foreground portion and the background portion, a first mask. Next, the user equipment may upscale the first mask to a resolution corresponding to the first image depicting the foreground item. The user equipment may then apply the up scaled first mask to the first image to form a second image depicting the foreground item with at least a portion of the background portion of the second image removed. The user equipment may then provide the second image depicting the foreground item to a publication system. In some of the example noted herein, a user may refer to a human user, a machine user (e.g., a computer configured by a software program to interact with the user equipment, or a combination thereof (e.g., a human assisted by a machine or a machine supervised by a human). However, the user is not considered part of the system 100, but as noted may access or otherwise be associated with the user equipment.

The network 190 may be any network that enables communication between or among the devices 140A-B, 110, and 115. Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired network (e.g., a plain old telephone system (POTS) network), a wireless data network (e.g., WiFi network), or any suitable combination thereof.

Figure 2:
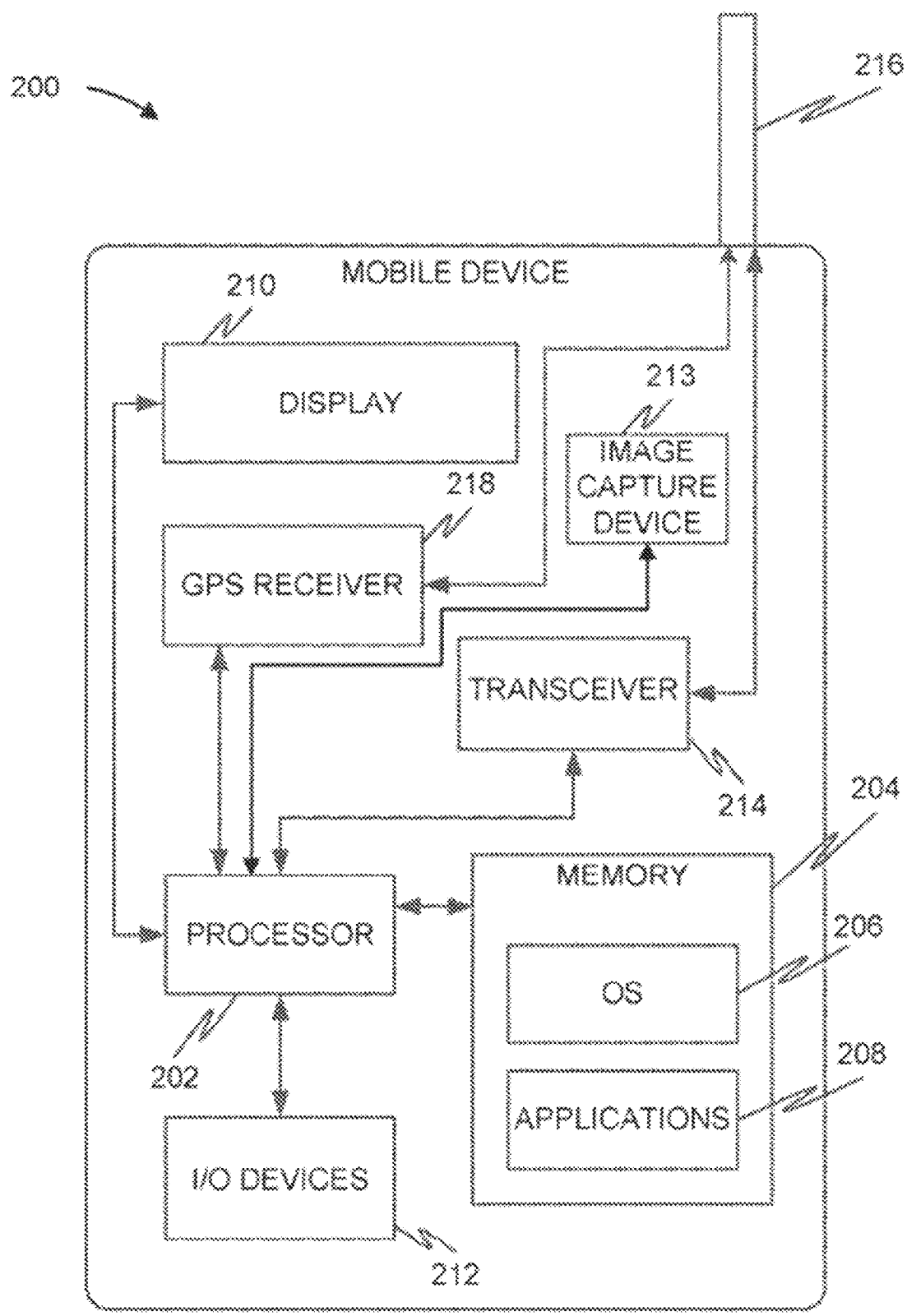
FIG. 2 is a diagram illustrating an example of a user equipment, in accordance with some example embodiments.

FIG. 2 is a diagram illustrating an example of a user equipment 200, which may be implemented to provide the user equipment 140A-B, in accordance with some example embodiments. As noted, the user equipment may be used to perform image cleanup, in accordance with some example embodiments. The user equipment may provide the cleaned up image to another device, such as server machine 110 at the publication system 105. The user equipment may be configured to perform one or more of the aspects discussed herein with respect to the user equipment, such as user equipment 140A-B. Furthermore, the user equipment may include an image cleanup system 300, which is described further below with respect to FIG. 3.

The user equipment 200 may include one or more processors, such as processor 202. The processor 202 may be any of a variety of different types of commercially available processors (e.g., central processing unit, graphics processing unit, image processing unit, digital processing unit, neural processing unit, ARM-based processors, and/or the like). The user equipment may further include a memory 204, such as a random access memory (RAM), a Flash memory, or other type of memory. The memory 204 may be accessible to the processor 202. The memory 204 may be adapted to store an operating system (OS) 206 and application programs 208. The processor 202 may be coupled, directly or via appropriate intermediary hardware, to a display 210 and to one or more input/output (I/O) devices 212 (e.g., a keypad, a touch panel sensor, a microphone, an image capture device 213, and the like). The image capture device 213 may form a portion of an image cleanup system 300, described with respect to FIG. 3.

The processor 202 may be coupled to a transceiver 214 that interfaces with at least one antenna 216. The transceiver 214 may be configured to wirelessly transmit and wirelessly receive cellular signals, WiFi signals, or other types of signals via the antenna 216, depending on the nature of the user equipment 200. Further, in some configurations, a GPS receiver 218 may also make use of the antenna 216 (or another antenna) to receive GPS signals.

The user equipment 200 may include additional components or operate with fewer components than described above. Further, the user equipment 200 may be implemented as a camera, an Internet of Things device (e.g., a sensor or other smart device) with some or all of the components described above with respect to FIG. 2. The user equipment 200 may be configured to perform any one or more of the aspect described herein. For example, the memory 204 of the user equipment 200 may include instructions comprising one or more units for performing the methodologies discussed herein. The units may configure the processor 202 of the user equipment 200, or at least one processor where the user equipment 200 has a plurality of processors, to perform one or more of the operations outlined below with respect to each unit. In some embodiments, the user equipment 200 and the server machine 110 may each store at least a portion of the units discussed above and cooperate to perform the methods of the present disclosure, as will be explained in more detail below.

Figure 3:
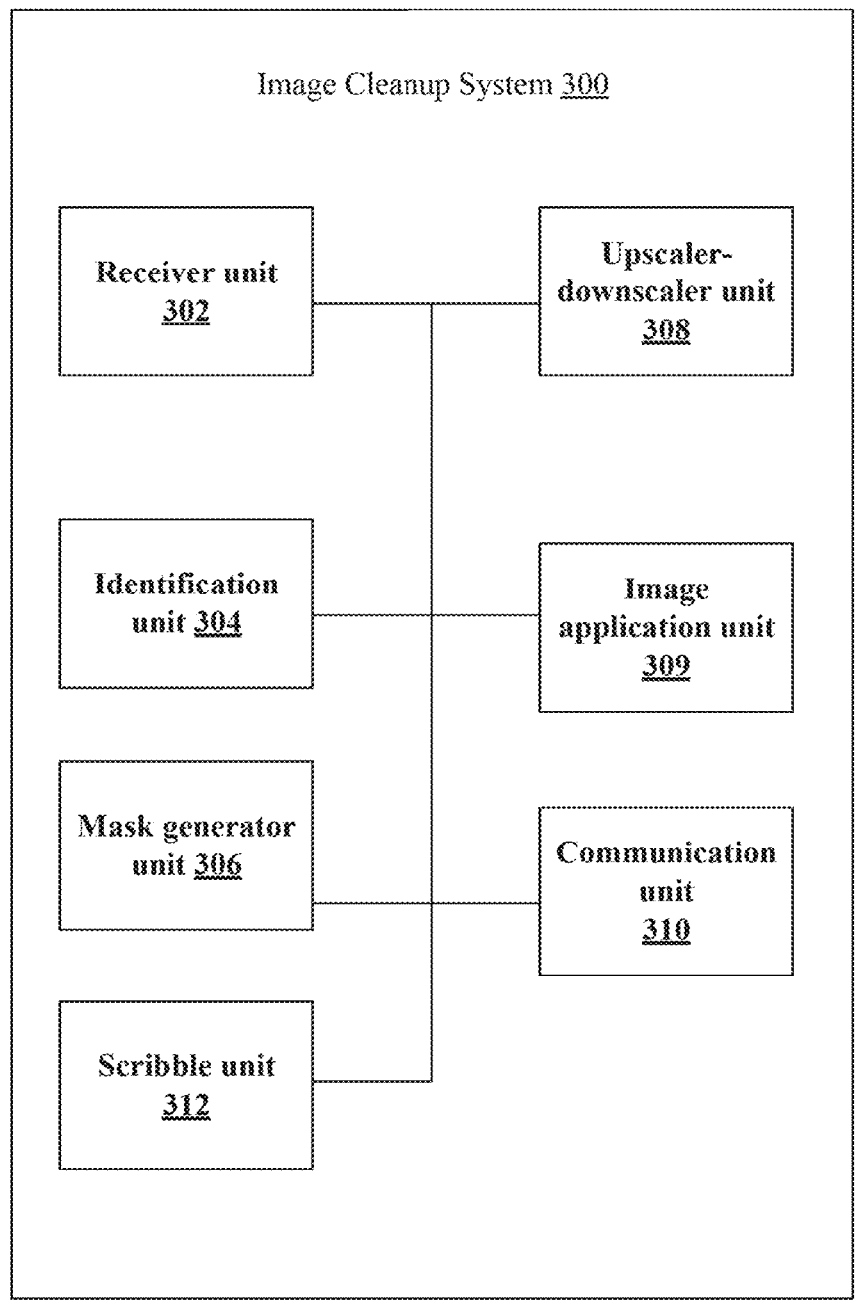
FIG. 3 depicts a block diagram of an image cleanup system configured to cleanup images, in accordance with some example embodiments.

FIG. 3 depicts a block diagram of an image cleanup system 300 configured to cleanup images, in accordance with some example embodiments, in accordance with some example embodiments. Some, if not all, of the image cleanup system may be included in the user equipment 200. Alternatively, or additionally, some, if not all, of the image cleanup system may be included in a backend server system or service, such as a cloud-based service accessible by the user equipment 200. The image cleanup system 300 may include or be coupled to an image capture device, such as image capture device 213. For example, the image capture device may include an image sensor, such as a camera, coupled to, or included in, the user equipment, although the image capture device or image cleanup system 300 may capture the image in other ways (e.g., screen capture of a displayed image, obtained from a storage device containing images, downloaded from another device, and/or the like). The image cleanup system 300 may include, temporarily or permanently, a processor (e.g., an image processor in communication with the image capture device 213), a memory (e.g., the memory 204), and communications components (e.g., transceiver 214, antenna 216, and GPS receiver 218) in the form of one or more units performing the methodologies described herein.

The image cleanup system 300 may include a receiver unit 302, an identification unit 304, a mask generation unit 306, an upscaler-downscaler unit 308, an image application unit 309, a scribble unit 312, and a communication unit 310, all of which may be configured to communicate with each other (e.g., via a bus, shared memory, or a switch). Although described as part of the mobile device 200, the image cleanup system 300 may be distributed across multiple devices, such that certain of the units associated with the image cleanup system 300 may reside in the user equipment 200 and certain other units may reside in in the server machine 110 or publication system 105. The units, whether on a single device or distributed across multiple systems or devices, may cooperate to perform any one or more of the methodologies described herein. Any one or more of the units described herein may be implemented using hardware (e.g., one or more processors of a machine) or a combination of hardware and software. For example, any units described herein may configure a processor (e.g., among one or more processors of a machine) to perform the operations described herein for that unit. Moreover, any two or more of these units may be combined into a single unit, and the functions described herein for a single unit may be subdivided among multiple unit. Furthermore, as described above and according to various example embodiments, unit described herein as being implemented within a single device may be distributed across multiple devices. For example, as referenced above with respect to FIG. 1, the server machine 110 may cooperate with the user devices 140A or 140B via the network 190 to perform the methods described herein. In some embodiments, one or more of the units or portions of the units, discussed above, may be stored on the server machine 110 as well as on the mobile device 200.

The receiver unit 302 may obtain an image depicting at least a foreground item. For example, the receiver unit may receive an image (e.g., pixel data) depicting at least one foreground item if interest and a background. The image may be obtained from an image capture device 213 (e.g., an image sensor, such as a camera, coupled to, or included in, the user equipment), a screen capture of a displayed image, obtained from a storage device containing images, downloaded from another device, downloaded from a 3$^{rd}$ party website, and/or the like). The image capture device 213 may include hardware components including an image sensor (e.g., charge-coupled device (CCD) or complementary metal-oxide-semiconductor (CMOS)). The image sensor may detect the image data of the photograph to be taken, and the image capture device 213 may pass the image data to the receiver unit 302. The receiver unit 302 may include a portion of the image capture device 213, or the image capture device 213 may include a portion of the receiver unit 302. The receiver unit 302 may communicate with the image capture device 213 as well as other units 304-309 via the communication unit 310.

Figure 6:
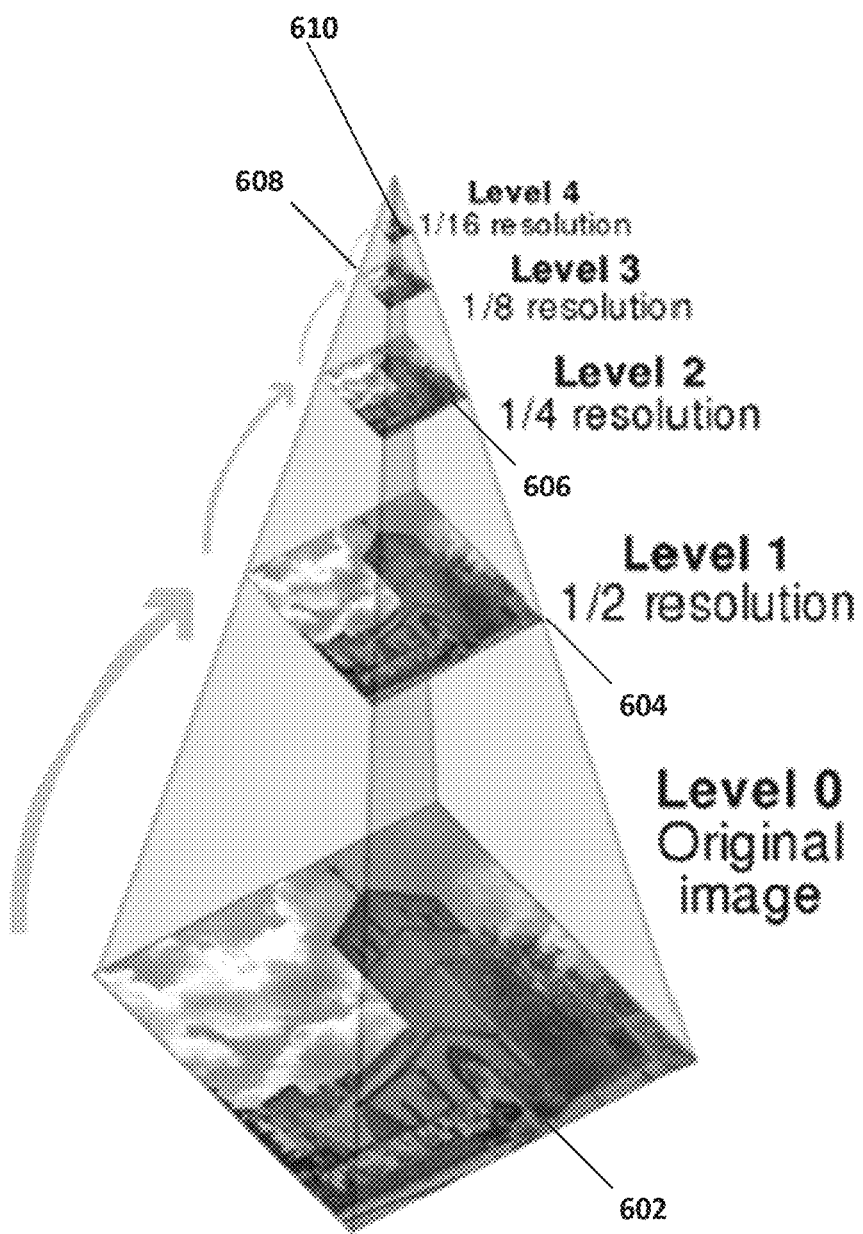
FIG. 6 depicts an example of a multiscale approach to subsampling, in accordance with some example embodiments.

The image cleanup system 300 may include, as noted, the upscaler-downscaler unit 308. For example, upscaler-downscaler unit may subsample a first image to a first level image. An example of the first level image is further described with respect to FIG. 6 at 608. In that example, the first level image is subsampled to 1/16 of its original size. Alternatively, or additionally, the upscaler-downscaler unit may also be used to upsample the images. For example, a subsampled mask or image may be upsampled to a larger pixel size. In the example of FIG. 6 for example, the subsampled image may be upsampled back to its original resolution shown at 602. In some example embodiments, a domain transform may be used to upscale and/or downscale. Although a variety of types of transforms may be used to upscale and/or downscale an image, in some embodiments an edge aware domain transform, such as "Domain Transform for Edge-Aware Image and Video Processing," E. Gastal and M. Oliveira, ACM SIGGRAPH 2011, may be used.

The image cleanup system 300 may include, as noted, the identification unit 304 to identify the foreground portion of an image from a background portion of the image. The identification unit 304 may include a machine learning (ML) model algorithm or model, such as a neural network, a convolution neural network (CNN), a generative adversarial network (GAN), a GrabCut algorithm, or other technology, to identify at least the foreground portion (and/or the foreground portion) of the image. The GrabCut algorithm typically assumes that the user provides an initial bounding box enclosing the object. In contrast, the image cleanup system 300 may, in accordance with some example embodiments, provide full automation by initializing the GrabCut algorithm with a predefined (e.g., 5-pixel) wide border along edges of the image as a solid background, so the remaining regions of the image are initialized as probable foreground.

The image cleanup system 300 may include, as noted, the mask generator unit 306. The mask generator unit may generate a first mask which may be applied to an image to mask the image so the foreground portion of the image remains. The image cleanup system 300 may include, as noted, an application unit 309. The application unit may apply a mask to an image to form another image depicting primarily the foreground portion. This other image may be provided, via the communication unit 310, to another system, such as the publication system 105. The image cleanup system 300 may also include, as noted, the 312 scribble unit to processes scribbles that modify the masks. For example, the GrabCut algorithm may allow a user equipment to scribble on a portion of an image or a mask to indicate that the scribbled portion was misclassified as foreground (or background). In some instances, the GrabCut algorithm (or other cleanup algorithm) may then be run to modify the image based on the scribble. When this is the case, the scribbled portion may be removed as part of the background (or added in the case of a misclassified background).

The communication unit 310 enables communication between the units depicted at FIG. 3 and/or enables communication with other devices and/or systems. For example, the communication unit 350 may include communications mechanisms, such as an antenna, a transmitter, one or more bus, and other suitable communications mechanisms capable of enabling communication between the units, the user equipment, publication system, and/or the other devices or systems.

Figure 4:
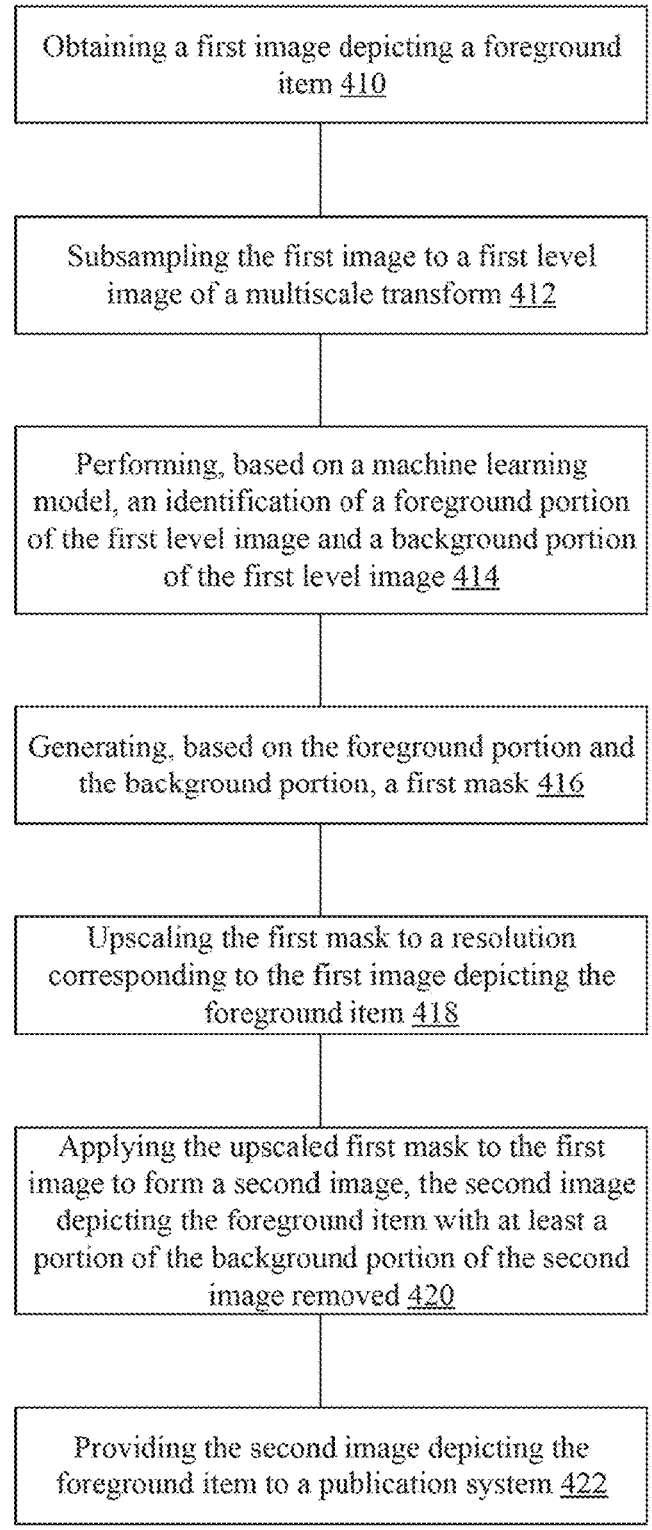
FIG. 4 depicts an example of a process for image cleanup, in accordance with some example embodiments.

FIG. 4 depicts an example of a process 400 for image cleanup, in accordance with some example embodiments. The description of FIG. 4 also refers to FIGS. 1, 5, and 6.

Figure 5:
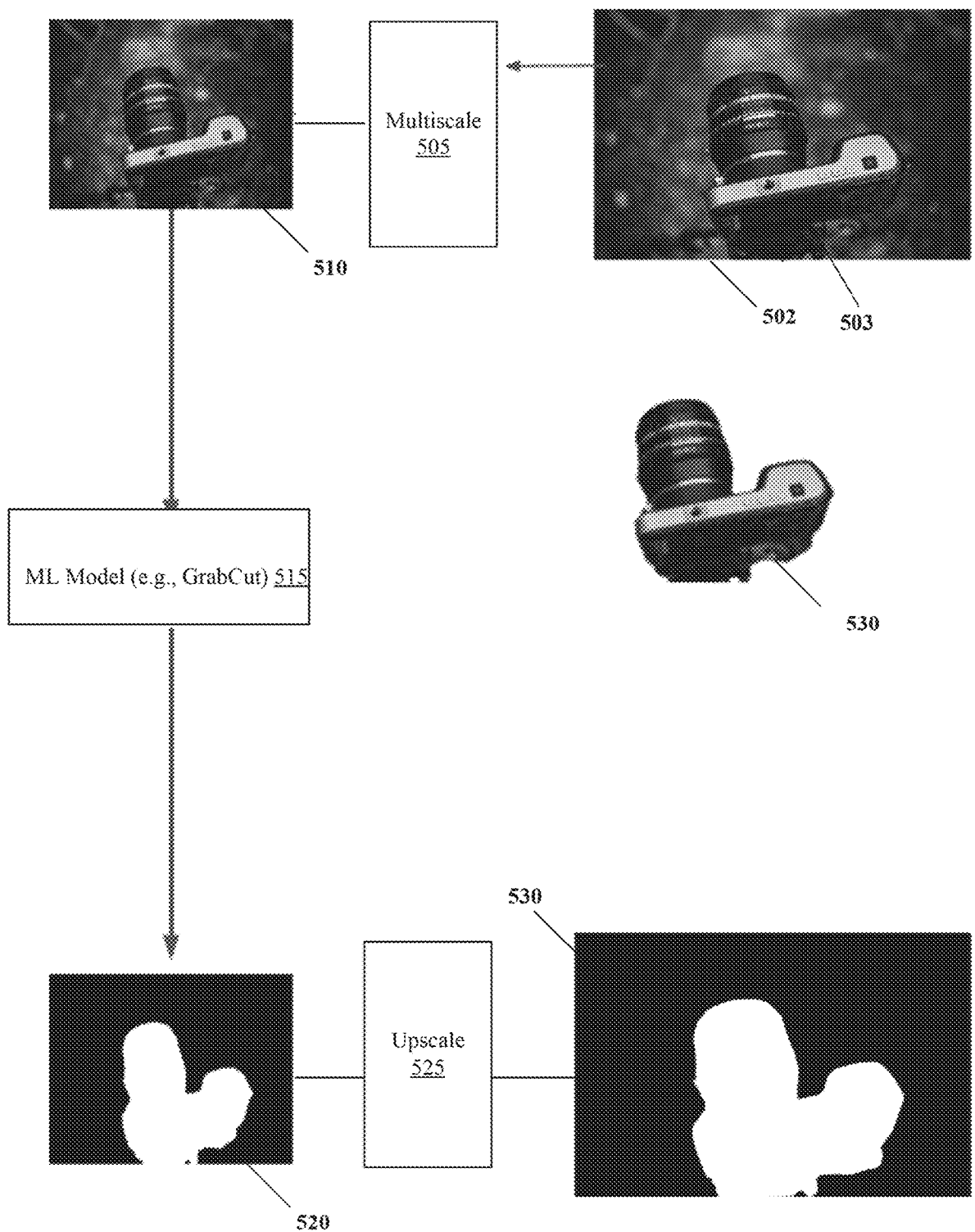
FIG. 5 depicts another example of a process for image cleanup, in accordance with some example embodiments.

At 405, the first image depicting a foreground item may be obtained by the user equipment. For example, a first image (which may include one or more items of interest in the foreground) may be captured by the user equipment, such as user equipment 140A. The first image may be captured by the user equipment using an image sensor, such as a camera, coupled to, or included in, the user equipment. Alternatively, the image may be captured via a screen capture of a displayed image, obtained from a storage device containing images, downloaded from another device, downloaded from a 3$^{rd}$ party website, or obtained in other ways. Referring to FIG. 5, it depicts an example of a first image 502 depicting a foreground item 503 (which in this example is a camera) and a background. In this example, the first image may have a resolution of 1600 pixels by 1066 pixels, although images of other resolutions may be used as well. Each of the pixels may represent data, such as pixel data.

To illustrate further by way of example, the user equipment may capture a first image including a foreground portion of the image and a background portion of the image. The foreground portion may include a foreground item of interest. To enable enhance publication or image search, the user equipment may remove some, if not all, of the background portion of the image, so that the foreground item is primarily depicted in the image. This focus on the foreground portion of the image (which depicts the item of interest) may enable other users on other devices to assess the actual item being published without distraction from the background. This focus may also enhance an image search by focusing on the item of interest in the image, rather than on an item depicted in the background (which is not of interest).

At 412, the first image may be subsampled to a first level image of a multiscale transform. For example, the user equipment may subsample the first image 503 from a resolution of 1600 pixels by 1066 pixels to a resolution of 500 pixels by 333 pixels. FIG. 6 depicts an example of a multiscale approach to subsampling. In the example of FIG. 6, the first image is represented by image 602 and is sub-sampled to a first level of about $\frac{1}{16}$, so image 610 has $\frac{1}{16}$ the resolution of image 602. In the multiscale approach, each level is subject to smoothing (or blurring) and subsampling. The smoothing may be performed using a smoothing function, such as a Gaussian average, for example. When the Gaussian average or blur is used, each pixel may include a local average that corresponds to a neighboring pixel(s) on another level (e.g., lower or higher level) of the multiscale pyramid depicted at FIG. 6. In some embodiments, the multiscale approach incudes subsampling the image first and only applying the GrabCut to the lowest resolution. After this initial step, the domain transform (DT) filter may be used to subsequently upsample the image, while only refining the image around boundary regions. This may provide a process which is 3 times faster than a traditional GrabCut. Although the previous example describes applying the GrabCut at the lowest ($\frac{1}{16}^{th}$) resolution of the multiscale approach, the GrabCut may be applied at other resolution levels as well.

At 414, an identification is performed, based on a machine learning model, of a foreground portion of the first level image and a background portion of the first level image. For example, the user equipment may include a machine learning model to identify at least the foreground portion of the image. The machine learning model may include a neural network, a convolution neural network (CNN), a generative adversarial network (GAN), a GrabCut algorithm, and/or or other technology. The machine learning model may include aspects of a multiscale GrabCut algorithm that is modified, in accordance with some example embodiments, to perform the GrabCut algorithm at one of the levels of the multiscale pyramid depicted at FIG. 6, such as the lowest resolution sub-sampled image 608. Moreover, the multiscale GrabCut algorithm may, in accordance with some example embodiments, automatically initialize with a predetermined bounding box, such as a 5-pixel wide border around the image, although the width of the bounding box may have other predetermined values as well.

In the example of FIG. 6, each level of the multiscale is graphically depicted. The image 602 is subsampled by $\frac{1}{2}$, $\frac{1}{4}$, $\frac{1}{8}$, and then $\frac{1}{16}$ resolution as shown at 604-610. Unlike a conventional multiscale GrabCut algorithm, the GrabCut algorithm may, in accordance with some example embodiments, be applied only at a given resolution level, such as the lowest resolution of the subsampled image 610. In the case of the GrabCut, image segmentation to identify the foreground portion may be performed iteratively using the image 608 based on a graph and then a cut through the graph which classifies the background pixels and the foreground pixels. Although a user accessing the user equipment may select on the display an initial bounding box around the foreground item depicted in the image to initialize the GrabCut, a predetermined bounding box may be automatically determined by the user equipment, in accordance with some example embodiments. For example, the predetermined bounding box may be automatically determined as a 5-pixel wide border around the first image, although the width of the bounding box may have other predetermined values as well. The bounding box pixels are used to initialize GrabCut as "solid background" in the GrabCut algorithm Next, the GrabCut proceeds to determine whether the pixels of the first image are likely background or foreground. In this way, the foreground and background portions of the image may be classified as likely foreground pixels or likely foreground pixels.

In some implementations, the GrabCut is iterative, such that the initial classification of foreground or background may be corrected by a user scribbling (e.g., marking) portions of the classified first image as a misclassification, in which case the GrabCut may be re-run to provide another estimate of which pixels are likely foreground pixels or likely foreground pixels.

At 416, a first mask is generated based on the foreground portion and the background portion identified for the sub-sampled image. FIG. 5 depicts an example of a first image 502 which is then subsampled, by a multiscale 505 pyramid algorithm, to form a subsampled image 510. The sub sampled image 510 is then provided to a ML model, such as the GrabCut 515. From the subsampled image 510, the GrabCut is able to provide a classification that estimates which pixels of the subsampled image are likely the foreground pixels and which pixels are likely the background pixels. The estimate is then used to generate a first mask 520.

At 418, the first mask may be upscaled to a resolution corresponding to the first image depicting the foreground item. Referring again to FIG. 5, the first mask 520 may be upscaled 525 to form an upscaled first mask 530 having the same or similar resolution as the original image 502. For example, the first mask 520 may have a resolution of 500 by 333 pixels, and then upscaled to a resolution of 1600 pixels by 1066 pixels to match the resolution of the original, first image 502. The upscaling may performed in a variety of ways to resize the image to the resolution of the first image. For example, an interpolation (e.g., a nearest-neighbor interpolation) may be used to resize the image. In some example embodiments, an edge aware domain transform may be used to upscale. "Domain Transform for Edge-Aware Image and Video Processing," E. Gastal and M. Oliveira, ACM SIGGRAPH 2011 provides an example of an edge aware domain transform, although other types of transforms may be used as well to upsample or downsample an image. For example, the domain transform (DT) filter may be used to upsample (or downsample) the image, while only refining the image around boundary regions.

Next, the upscaled first mask may be applied, at 420, to the first image to form a second image depicting the foreground item with at least some, if not all, of the background portion of the second image removed. Referring again to FIG. 5, the upscaled first mask 530 is applied to the first image 502 to form the second image 530. This second image 530 masks out (e.g., removes) some, if not all, of the background portion from the first image 502, so that the foreground item 503 remains in the second image 530.

At 422, the second image depicting the foreground item may be provided to a system, such as a publication system. Referring again to FIG. 5, the second image 530 may be provided to the publication system 105 or other type of system or device. For example, the second image may be caused to be displayed as a listing of the publication system, such that a plurality of user equipment may view the listing. Removing the background such that the foreground item remains (as shown at the second image 530) may improve the ability of the publication system to identify similar items or publish the image (e.g., so that other user equipment may assess the foreground item). Alternatively, or additionally, the user equipment may provide the second image depicting the foreground item to an image search system for searching for items which are similar or related to the foreground item.

Figure 7:
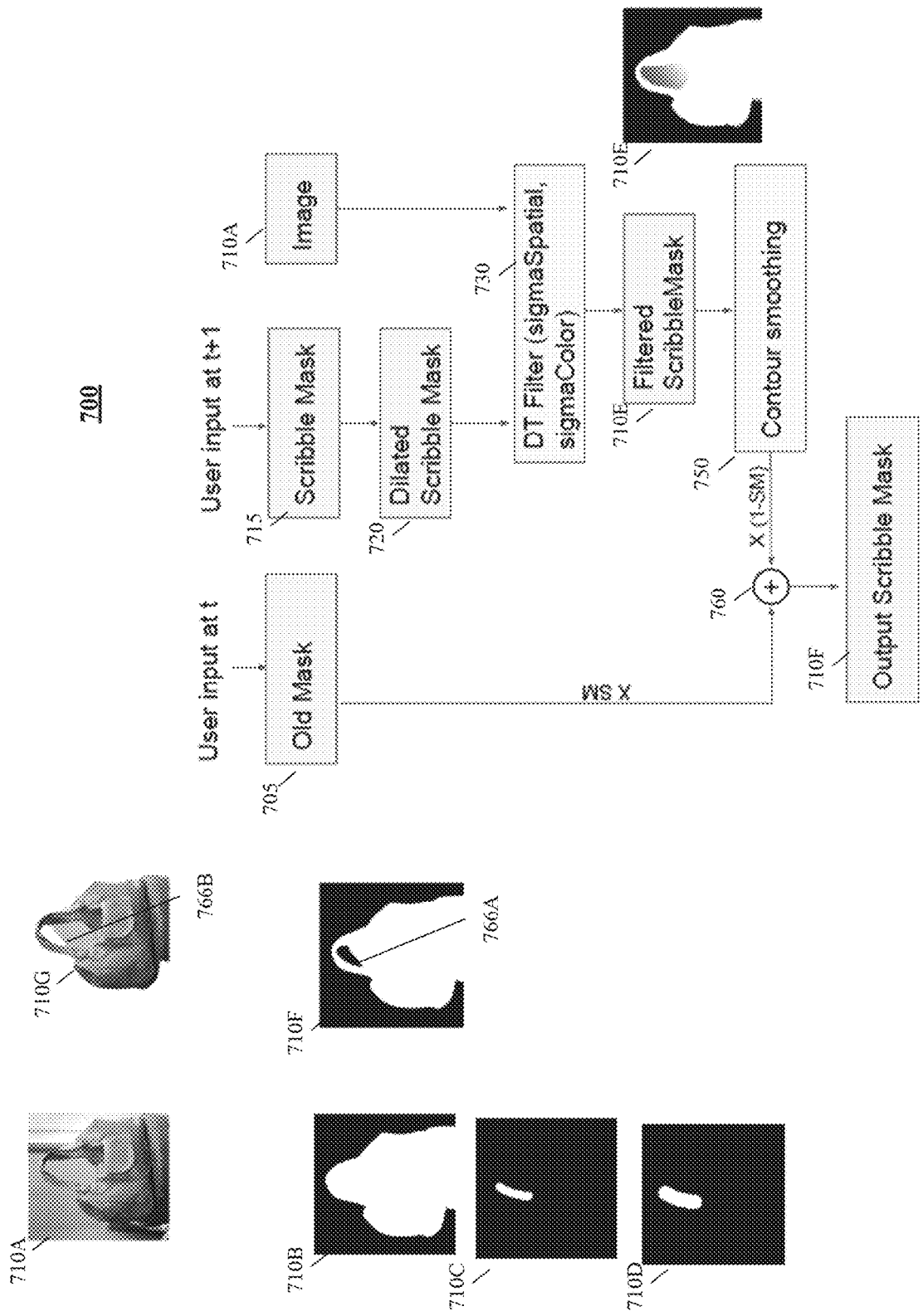
FIG. 7 depicts an example of a process for image touch up, in accordance with some embodiments.

As noted, the process 400 may be used to cleanup images. In some instances, the automatic image cleanup may need so called "touch up." FIG. 7 depicts an example process 700 for image touch up, in accordance with some embodiments. In some embodiments, the process 700 may be used to modify a first mask 710A generated automatically by process 400, although process 700 may be used without the use of process 400 as well. The description of FIG. 7 also refers to FIG. 5.

At 705, a first mask 710B may be received. For example, the first mask 710B may correspond to the first mask generated automatically without user intervention by process 400. The first mask 710B may then be presented on a display of a user equipment, to enable scribbling, at 715, on the first mask 710B. For example, the first mask 710B may be presented on the display of the user equipment to enable touch up by scribbling to indicate which portion of the mask to remove (or add) from the first mask. A mask of the scribble is depicted at 710C. In this example, the scribbling indicates which portion needs to be excluded from the first mask 710B and thus the corresponding foreground image 710A. In some embodiments, the scribble may instead be applied to first image 710A, which is displayed at the user equipment. At 720, the scribble may be dilated, such as expanded. For example, the scribble at 710C may be expanded so that it is larger as shown by the dilated scribble at 710D.

At 730, the first image 710A is processed to generate a filtered scribble mask. For example, the domain transform (DT) filter, such as "Domain Transform for Edge-Aware Image and Video Processing," E. Gastal and M. Oliveira, ACM SIGGRAPH 2011, may be used to filter the image 710A while only refining the image around boundary regions. The filtered image is then binarized and thresholded to form a binarized and thresholded image, which may serve as a mask. And, then the dilated scribble mask 710D is applied to the binarized and thresholded mask to form the filtered scribble mask 710E. The filtered scribble mask 710E may be further processed with contour smoothing at 750. The filtered scribble mask 710E may (which may be smoothed at 750) may be combined, at 760, with the original filter mask 705/710B to form a new, updated filter mask 710F. As can be seen, the new, updated filter mask 710F may now exclude, from the foreground, the portion 766A associated with the scribble. When the new, updated filter mask 710F is applied to the original image 710A to form the updated image, the updated image 710G may exclude portion 766B as shown at new updated image 710G. The process at 700 may be repeated again if desired to further cleanup the image 710G (in which case the new updated image 710G would be the input at 730 and the scribbling would take place on the updated mask 710F). In some embodiments, the DT filter applied at 730 is applied to a subsampled image 710A and scribble mask 710D at, for example, 1/16 scaling (e.g., from 1600 pixels by 1200 pixels to 400 pixels by 300 pixels) as noted above with the pyramid, multiscale approach of FIG. 6.

Figure 8:
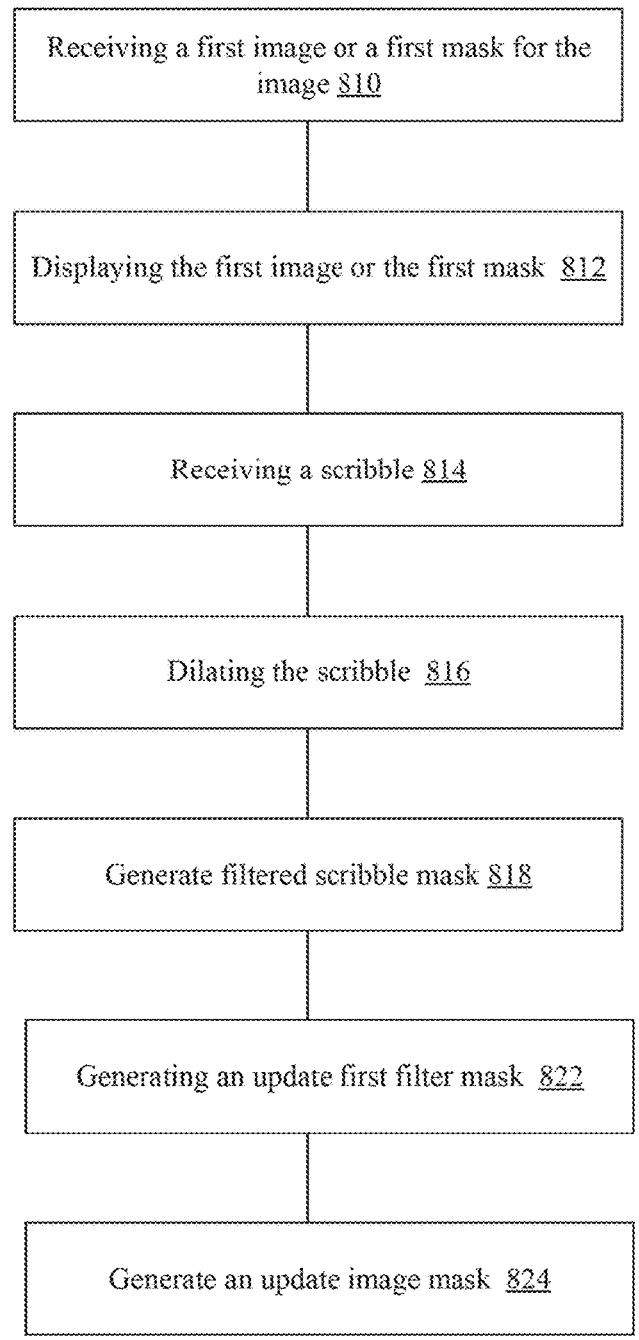
FIG. 8 depicts another example of a process for image touch up, in accordance with some embodiments.

FIG. 8 depicts an example of a process 800 for image cleanup, in accordance with some example embodiments. The description of FIG. 8 also refers to FIG. 7.

At 810, a first image and/or its corresponding first image may be received for image clean. For example, a first mask 710B and/or a first image 710 may be received by the image cleanup system of the user equipment. At 812, the first mask and/or the corresponding first image may be displayed on the user equipment. This display enables a user associated with the user equipment to scribble a mark on the display (or provide the scribble in other forms). The scribble indicates which portion of the mask or image needs cleanup. For example, if the mask classifies or identifies a portion as foreground which should have been identified as background, a scribble (e.g., scribble shown at 710C) may indicate the portion (e.g., pixels) which need to be cleaned up by removing the misclassified portion (although the misclassified portion may be added in some cases as well). In response to the scribble, the image cleanup system may receive, at 814, an indication of the scribble, such as which pixels were indicated as scribbled. At 816, the scribble may be dilated. For example, the dilation may expand the size of the scribble by a predetermined amount of pixels (e.g., expand the size in pixels by a predetermined percentage of the area of the scribble, such as a 1%, 2%, 3%, 4%, 5%, or other percentage increase).

At 818 a filtered scribble mask is generated. The image, such as image 710A, may be binarized and thresholded to form a binarized and thresholded image, which may be used as a mask. The dilated scribble mask 710D is applied to the binarized and thresholded mask to form the filtered scribble mask 710E. The image 710A and scribble mask 710D may be subsampled to enable binarization, thresholding, and application of the scribble mask, after which a DT may be applied to upsample the filtered scribble mask 710E to have the same or similar resolution as the original image 710A. At 822, the filtered scribble mask 710E may be combined with the original filter mask 710B to form a new, updated filter mask. At 824, the new, updated filter mask 710F may then be applied to the original image 710A to generate an updated image 710G which, in this example, excludes a portion corresponding to the scribble.

In some example embodiments, the generation of the mask, such as mask 530 may be performed using a neural network, such as a convolutional neural network including pooling. An example of this type of neural network may be found in "A Simple Pooling-Based Design for Real-Time Salient Object Detection," Jiang-Jiang Liu et al., CVPR 2019. For example, supervised learning may be used to train (e.g., using training images labeled to distinguish foreground pixels from background pixels) the neural network to automatically segment foreground portion of images from the background portion. Alternatively, unsupervised learning, such as through the use of Generative Adversarial Networks, may be used to generate the mask, such as mask 530. In some example embodiments, a saliency map may be used to further adapt the binary mask.

In some example embodiments, the GrabCut algorithm is automatically initialized with a predefined (e.g., 5-pixel wide) border along the edges of the image as a solid background while the remaining regions of the image are initialized probable foreground. The GrabCut is then run to identify the pixels as foreground pixels or background pixels. For example, the predefined border, such as a rectangle is placed around the image. The border pixels are classified as solid background, while the interior of the border is unknown. The GrabCut algorithm then performs an initial hard labelling of each pixel, such as solid background based on the border or any user provided indication (e.g., a scribble indicating foreground pixel or background pixel). Next, a Gaussian Mixture Model (GMM) models the foreground and background. The GMM learns and creates a pixel distribution, such that the unknown pixels are labelled either probable foreground or probable background depending on a relation with the other hard-labelled pixels (e.g., classification or clustering based on color statistics). The GrabCut then generates, from this pixel distribution, a graph, wherein nodes in the graphs are the pixels of the image. The graph includes two nodes additional nodes referred to as a Source node and Sink node. Every foreground pixel is connected to the Source node and every background pixel is connected to Sink node. The weights of edges connecting pixels to the Source node are defined by the probability of a pixel being a foreground pixel, and weights of edges connecting pixels to the Sink node are defined by the probability of a pixel being a background pixel. These weights (between the pixels) are defined by the edge information or pixel similarity. If there is a large difference in pixel color, the edge between the pixels will have a corresponding low weight. The minicut algorithm is then used to segment the graph. The minicut algorithm cuts the graph in two to separate the Source node and Sink node based on a cost function, such as a minimum cost function. For example, the cost function may correspond to the sum of all weights of the edges that are cut. After the cut, all the pixels connected to Source node are classified as foreground, and the pixels connected to Sink node are classified as background. The GrabCut process may iterate until the classification of pixels converges.

In some example embodiments, the multiscale approach is configured such that the image is subsampled and a GrabCut is only performed at the lowest resolution. In some example embodiments, upsampling is performed using a domain transform (DT) filter that refines the image around boundary regions.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

The invention claimed is:

1. A system comprising:
    at least one processor; and
    at least one memory including instructions that, upon execution by the at least one processor, cause the system to perform operations comprising:
        generating a first mask based on identification of a foreground portion of a first level image and of a background portion of the first level image, the first level image associated with a multiscale transform of a first image depicting a foreground item;
        receiving, via a user interface, first user input, the first user input indicating a modification to the first mask; and
        applying, by the at least one processor and based on the modification to the first mask, a second mask to the first image to form a second image, the second image depicting the foreground item with at least a portion of the background portion being removed.

2. The system of claim 1, the operations further comprising:
    generating a third mask based on applying a filter to the first user input indicating the modification to the first mask; and
    generating the second mask based on combining the third mask and the first mask.

3. The system of claim 1, the operations further comprising causing presentation, on a display of a user equipment, of the first mask, wherein the first user input corresponds to a user interaction with the presentation of the first mask.

4. The system of claim 1, the operations further comprising causing presentation, on a display of a user equipment, of the first level image, wherein the first user input corresponds to a user interaction with the presentation of the first level image.

5. The system of claim 1, the operations further comprising modifying, based on the first user input, the first mask by at least adding or removing one or more pixels of the first mask.

6. The system of claim 1, the operations further comprising:
    generating a third mask based on identification of a foreground portion of the second image and of a background portion of the second image;
    receiving, via the user interface, second user input, the second user input indicating a modification to the third mask; and
    applying, by the at least one processor and based on the modification to the third mask, a fourth mask to the second image to form a third image.

7. The system of claim 1, wherein the first user input comprises a scribble.

8. The system of claim 1, the operations further comprising:
    subsampling the first image through a plurality of image levels to the first level image, the multiscale transform including the plurality of image levels; and
    performing a smoothing function at each image level of the plurality of image levels.

9. The system of claim 1, the operations further comprising upscaling, prior to applying the second mask to the first image, the second mask to a resolution corresponding to the first image depicting the foreground item.

10. The system of claim 9, wherein the upscaling further comprises applying a domain transform to upscale and smooth the first mask.

11. The system of claim 1, wherein the second mask is smoothed prior to applying the second mask to the first image.

12. The system of claim 1, the operations further comprising causing presentation, on a display of a user equipment, the second image depicting the foreground item as an item listing of a publication system.

13. A method comprising:
    generating a first mask based on identification of a foreground portion of a first level image and of a background portion of the first level image, the first level image associated with a multiscale transform of a first image depicting a foreground item;
    receiving, via a user interface, first user input indicating a modification to the first mask; and
    applying, based on the modification to the first mask, a second mask to the first image to form a second image, the second image depicting the foreground item with at least a portion of the background portion being removed.

14. The method of claim 13, further comprising:
    generating a third mask based on applying a filter to the first user input indicating the modification to the first mask; and
    generating the second mask based on combining the third mask and the first mask.

15. The method of claim 13, further comprising causing presentation, on a display of a user equipment, of the first mask, wherein the first user input corresponds to a user interaction with the presentation of the first mask.

16. The method of claim 13, further comprising causing presentation, on a display of a user equipment, of the first level image, wherein the first user input corresponds to a user interaction with the presentation of the first level image.

17. The method of claim 13, further comprising modifying, based on the first user input, the first mask by at least adding or removing one or more pixels of the first mask.

18. The method of claim 13, further comprising:
    generating a third mask based on identification of a foreground portion of the second image and of a background portion of the second image;
    receiving, via the user interface, second user input, the second user input indicating a modification to the third mask; and
    applying, based on the modification to the third mask, a fourth mask to the second image to form a third image.

19. The method of claim 13, wherein the first user input comprises a scribble.

20. One or more non-transitory computer-readable medium storing instructions executable by at least one processor to cause the at least one processor to perform operations comprising:
    generating a first mask based on identification of a foreground portion of a first level image and of a background portion of the first level image, the first level image associated with a multiscale transform of a first image depicting a foreground item;
    receiving, via a user interface, first user input indicating a modification to the first mask; and
    applying, by the at least one processor and based on the modification to the first mask, a second mask to the first image to form a second image, the second image depicting the foreground item with at least a portion of the background portion being removed.

* * * * *